(12) United States Patent
Okajima et al.

(10) Patent No.: US 7,377,595 B1
(45) Date of Patent: May 27, 2008

(54) BICYCLE RIM

(75) Inventors: Shinpei Okajima, Osaka (JP);
Tsutomu Muraoka, Osaka (JP);
Takashi Yaegashi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/680,080

(22) Filed: Feb. 28, 2007

(51) Int. Cl.
*B60B 21/06* (2006.01)
*B60B 25/00* (2006.01)

(52) U.S. Cl. ............... 301/58; 301/95.102; 301/95.107

(58) Field of Classification Search ............... 301/55, 301/58, 64.702, 64.703, 64.704, 67, 70, 95.101, 301/95.102, 95.103, 95.104, 95.105, 95.106, 301/95.107, 95.108, 104; 29/894.33, 894.333
See application file for complete search history.

(56) References Cited

U.S. PATENT DOCUMENTS

| | | | |
|---|---|---|---|
| 3,917,352 A * | 11/1975 | Gageby | 301/64.703 |
| 4,294,490 A * | 10/1981 | Woelfel | 301/64.703 |
| 4,983,430 A | 1/1991 | Sargent | |
| 4,995,675 A | 2/1991 | Tsai | |
| 5,490,719 A | 2/1996 | Lew | |
| 5,540,485 A | 7/1996 | Enders | |
| 5,549,360 A | 8/1996 | Lipeles | |
| 5,975,645 A | 11/1999 | Sargent | |
| 6,283,557 B1 | 9/2001 | Okajima et al. | |
| 6,347,839 B1 * | 2/2002 | Lew et al. | 301/95.102 |
| 6,398,313 B1 | 6/2002 | Lew | |
| 6,761,847 B2 | 7/2004 | Maggiolan | |

FOREIGN PATENT DOCUMENTS

| | | |
|---|---|---|
| EP | 1698489 | 9/2006 |
| JP | 60-080902 A | 5/1985 |
| JP | 61-125901 A | 6/1986 |
| JP | 61244602 A * | 10/1986 |
| JP | 62-128803 A | 6/1987 |
| JP | 2003-260904 A | 9/2003 |

* cited by examiner

*Primary Examiner*—Russell D. Stormer
*Assistant Examiner*—Kip T Kotter
(74) *Attorney, Agent, or Firm*—Global IP Counselors, LLP (57) ABSTRACT

A bicycle rim is provided with an annular metallic rim member and a reinforcing member. The annular metallic rim member has a plurality of spoke attachment areas with at least one spoke attachment opening in each of the spoke attachment areas and a plurality of intermediate areas disposed between adjacent pairs of the spoke attachment areas. The reinforcing member extends circumferentially about the annular metallic rim member to overlie the spoke attachment areas of the annular metallic rim member. The reinforcing member has a plurality of discrete spoke attachment area reinforcing parts overlying a corresponding one of the spoke attachment areas of the annular metallic rim member. The reinforcing member also has a rim reinforcing part overlying the intermediate areas of the annular metallic rim member and at least partially overlying the discrete spoke attachment area reinforcing parts.

25 Claims, 9 Drawing Sheets

BICYCLE RIM

BACKGROUND OF THE INVENTION

1. Field of the Invention

This invention generally relates to a bicycle rim. More specifically, the present invention relates to a reinforced bicycle rim that has an annular metallic rim member with reinforcing resin material disposed around the spoke attachment openings.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes within the spoke attachment holes in the rim.

Recently, bicycle wheels have been designed that have utilized spokes with higher tension between the rim and the hub to provide a more rigid wheel. When the tension in the spokes becomes very high, very strong rims are required. If the rim is made thicker over its entire circumference or a steel rim is used, then the rim may become undesirably heavy. Thus, several attempts have been made to create rims that are lightweight and can accommodate high tension spokes. One example of a bicycle rim that can accommodate high tension spokes is disclosed in U.S. Pat. No. 6,283,557, assigned to Shimano, Inc. The bicycle rim of this patent uses spokes that are attached to side surfaces of the rim by using special washers. While this rim works very well, it requires special washers that are attached to the ends of the spokes having bent ends. Several bicycle wheels have been developed that use straight spokes. These straight spokes are very strong and allow for higher tension to be used in the spokes. However, again, when the tension in the straight spokes becomes very high, then very strong rims are required. As a result, thicker and/or reinforced rims are needed when using straight spokes under high tension. Some of these reinforcements are welded or brazed to the rim, which requires precise control of heat treatment when welding or brazing. Thus, these thicker or reinforced rims are often heavy, difficult to manufacture and/or expensive to manufacture.

In view of the above, it will be apparent to those skilled in the art from this disclosure that there exists a need for an improved reinforced rim. This invention addresses this need in the art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a rim that is relatively simple and inexpensive to manufacture and assemble.

The foregoing objects can basically be attained by providing a bicycle rim that comprises an annular metallic rim member and a reinforcing member.

The annular metallic rim member includes a plurality of spoke attachment areas with at least one spoke attachment opening formed in each of the spoke attachment areas and a plurality of intermediate areas disposed between adjacent pairs of the spoke attachment areas. The reinforcing member extends in a circumferential direction about the annular metallic rim member and exteriorly overlying the annular metallic rim member. The reinforcing member includes a plurality of discrete spoke attachment area reinforcing parts and a rim reinforcing part. The discrete spoke attachment area reinforcing parts are individually spaced apart in the circumferential direction such that a corresponding one of the spoke reinforcing parts overlies a corresponding one of the spoke attachment areas of the annular metallic rim member. The rim reinforcing part overlies the intermediate areas of the annular metallic rim member and at least partially overlies the discrete spoke attachment area reinforcing parts.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
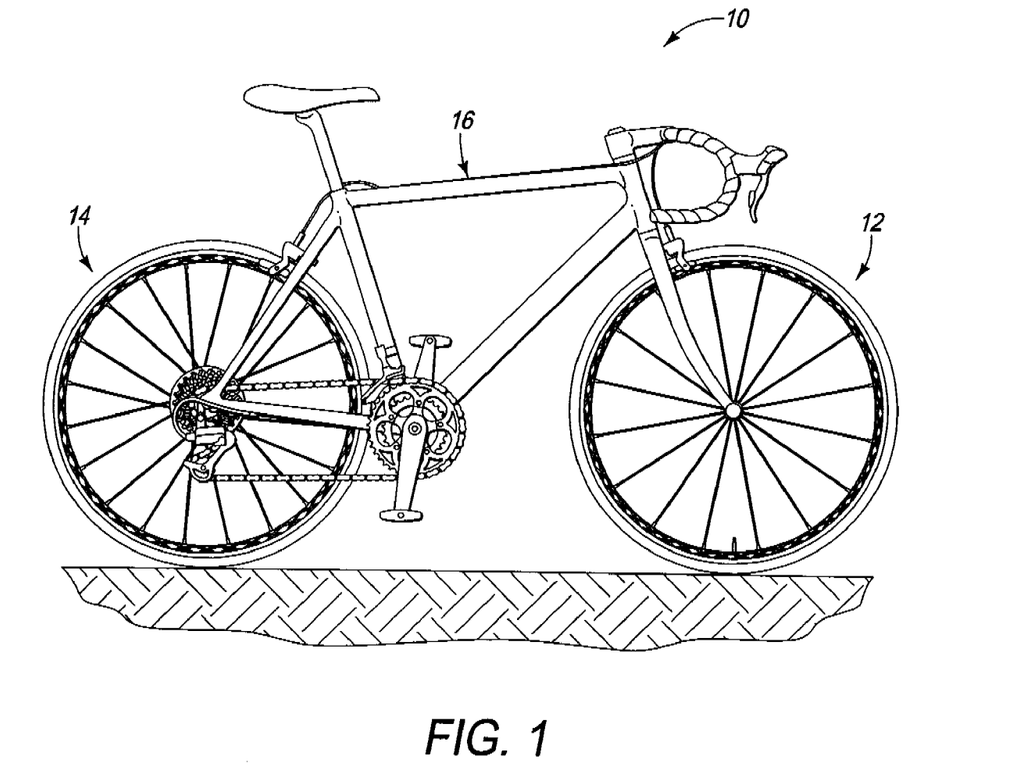
FIG. 1 is a side elevational view of a bicycle with a front bicycle wheel and a rear bicycle wheel in accordance with a first embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Figure 2:
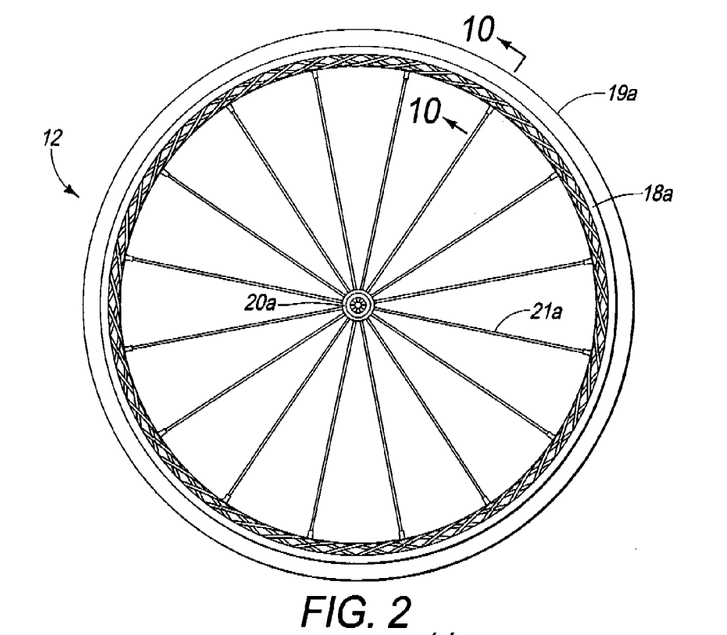
FIG. 2 is a side elevational view of the front wheel illustrated in FIG. 1 in accordance with the first embodiment of the present invention.

Generally, the present invention is applied in the same manner to both of the bicycle wheels 12 and 14. Also some of the parts of the bicycle wheels 12 and 14 are identical or functionally identical (have the same function but are not exactly identical). For the sake of simplicity and convenience, the identical parts and functionally identical parts of the bicycle wheels 12 and 14 will be given the same reference numerals. Referring to FIG. 2, the front bicycle wheel 12 basically includes an annular rim 18a with a pneumatic tire 19a, a center hub 20a, and a plurality of spokes 21a extending between the center hub 20a and the annular rim 18a. Similarly, the rear bicycle wheel 14 basically includes an annular rim 18b with a pneumatic tire 19b, a center hub 20b, and a plurality of spokes 21b extending between the center hub 20b and the annular rim 18b.

Figure 3:
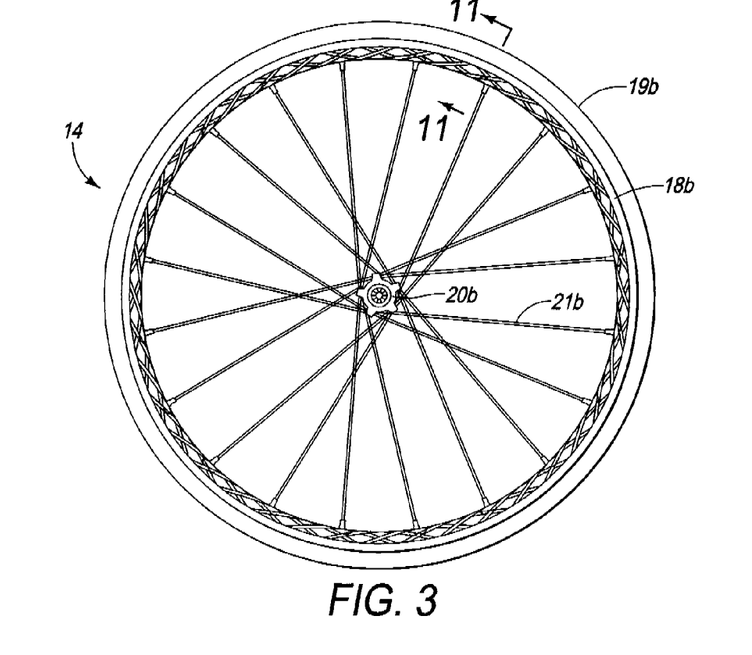
FIG. 3 is a side elevational view of the rear wheel illustrated in FIG. 1 in accordance with the first embodiment of the present invention.
Figure 4:
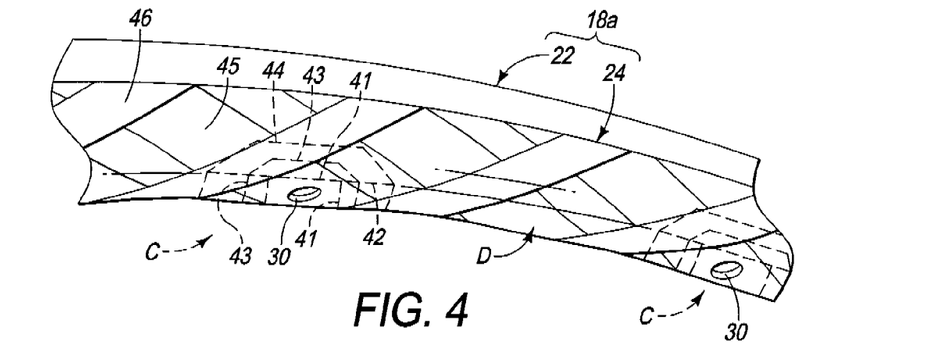
FIG. 4 is a partial perspective view of the front rim for the front wheel illustrated in FIGS. 1 and 2 in accordance with the first embodiment of the present invention.

Referring to FIG. 2, the rim 18a is an annular member designed for rotation about a center axis of the front bicycle wheel 12. In other words, the rim 18a is substantially circular as seen in side elevation (FIG. 2). Likewise, the rim 18b is an annular member designed for rotation about a center axis of the rear bicycle wheel 14. In other words, the rim 18a is substantially circular as seen in side elevation (FIG. 3). The rim 18b of the rear bicycle wheel 14 is identical to the rim 18a of the front bicycle wheel 12, except that their cross-sectional profiles are different. In particular, the rim 18a of the front bicycle wheel 12 has the cross-sectional profile illustrated in FIGS. 8 and 10, while the rim 18b of the rear bicycle wheel 14 has the cross-sectional profile illustrated in FIG. 11. In view of the similar construction of the rims 18a and 18b, only the rim 18a of the front bicycle wheel 12 will be discussed and illustrated in detail herein. It will be apparent to those skilled in the art form this disclosure that the construction of the rim 18a as discussed and illustrated herein applies to the construction of the rim 18b.

The rim 18a basically includes an annular metallic rim member 22 with a resin reinforcing member 24 applied to the annular metallic rim member 22. The resin reinforcing member 24 is formed of a plurality of layers of fiber reinforced resin/plastic sheets that reinforce the annular metallic rim member 22 with extra reinforcement at the spoke attachment areas as discussed below.

Figure 8:
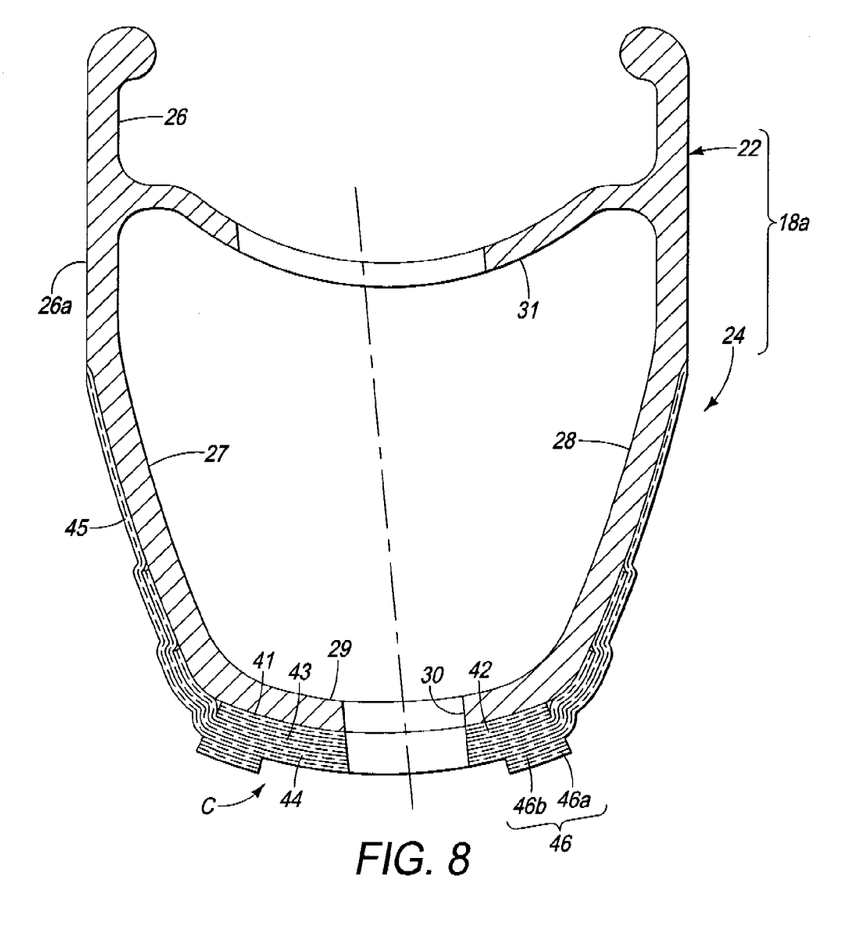
FIG. 8 is an enlarged cross sectional view of the front rim for the front wheel as seen along section line 8-8 of FIG. 5, with the reinforcing member applied to the metallic rim member in accordance with the first embodiment of the present invention.
Figure 10:
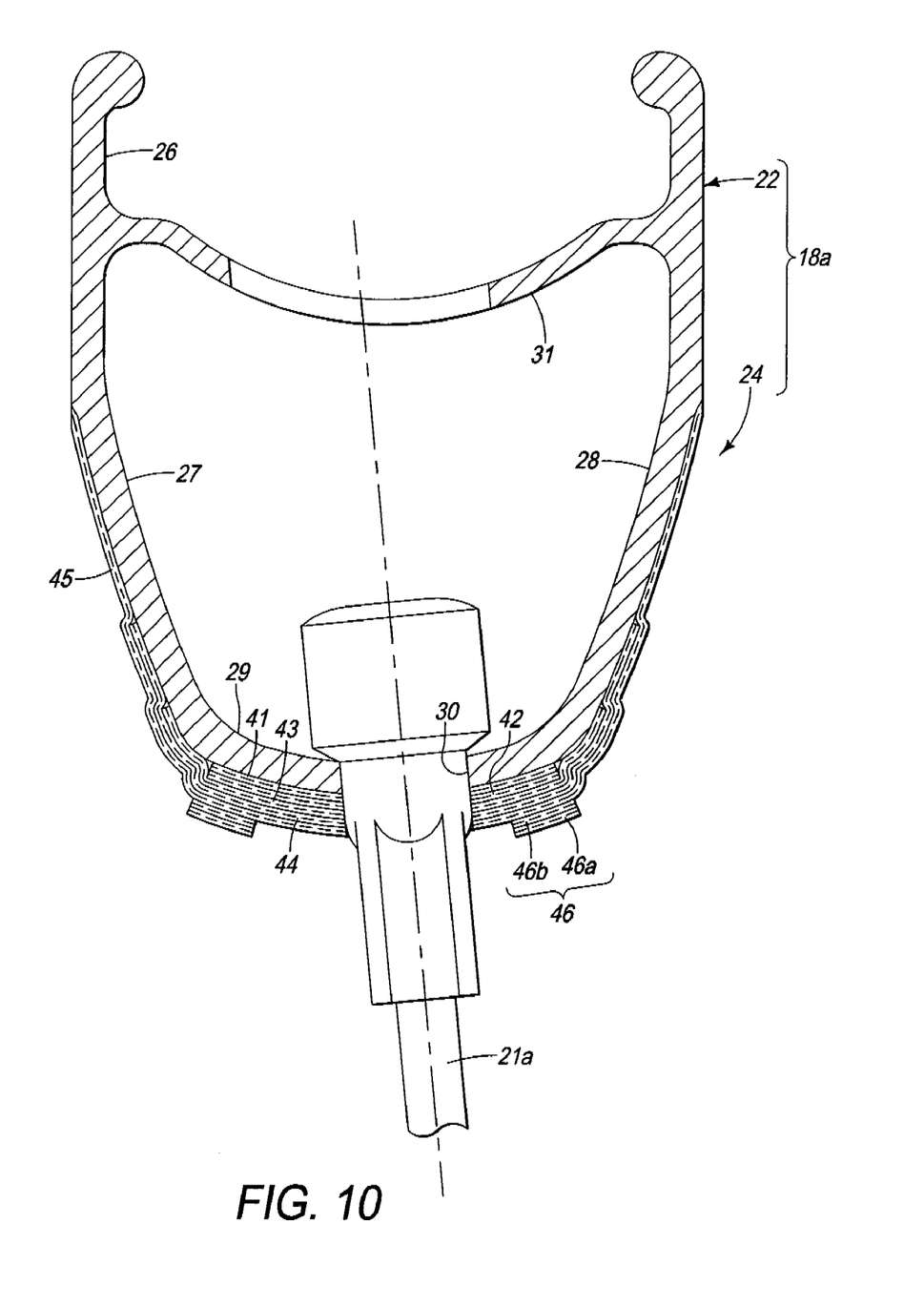
FIG. 10 is an enlarged cross sectional view, similar to FIG. 8, of the front rim for the front wheel as seen along section line 10-10 of FIG. 2 showing one of the spokes attached to the front rim.

As seen in FIGS. 8 and 10, the annular metallic rim member 22 is constructed of a substantially rigid material, such as those materials, which are well known in the art. For example, the annular metallic rim member 22 can be constructed of any suitable metallic material, such as plated steel, stainless steel, aluminum, magnesium or titanium. The annular metallic rim member 22 basically includes an annular tire attachment portion 26 adapted to have the tire 19a mounted thereon, a first annular side wall portion 27, a second annular side wall portion 28 and an inner annular wall portion 29 connecting the first and second annular side wall portions 27 and 28 with a plurality of spoke attachment openings 30 formed in the inner annular wall portion 29. The annular tire attachment portion 26 includes an annular connecting section 31 connecting the first and second annular side wall portions 27 and 28 such that an annular hollow area is bounded by the first and second annular side wall portions 27 and 28, the inner annular wall portion 29 and the annular connecting section 31. Thus, the annular metallic rim member 22 is a tubular member.

Basically, the annular metallic rim member 22 has a uniform cross-sectional profile about its entire circumference, except that material as been removed to form spoke access holes in the annular tire attachment portion 26 that are aligned with the spoke attachment openings 30, material has been removed to form a valve attachment hole in both the annular tire attachment portion 26 and the inner annular wall portion 29 to receive an air filling valve (not shown), and material as been removed from the inner annular wall portion to form the spoke attachment openings 30. In the illustrated embodiment, the wall portions 27, 28 and 29 are preferably constructed to be thinner than similar portions of non-reinforced metallic rims.

The spoke attachment openings 30 are evenly spaced about an innermost part of the circumference of the inner annular wall portion 29 for receiving the spokes 21a therein as best understood from FIGS. 1 and 10. The annular tire attachment portion 26 is an outer annular portion of the annular metallic rim member 22 that is configured and arranged to have the tire 19a mounted thereon in a conventional manner. The annular tire attachment portion 26 forms a substantially U-shaped tire receiving recess as seen in cross-section in FIG. 8. The tire attachment portion 26 also forms a pair of annular braking surfaces 26a with annular ribs formed at its free ends to retain beads of the tire 19a in a conventional manner. The annular braking surfaces 26a face outwardly away from the center plane to engage conventional rim brakes.

The resin reinforcing member 24 is preferably attached to the annular metallic rim member 22 such that the reinforcing resin material continuously extends from the first annular side wall portion 27 across the inner annular wall portion 29 to the second annular side wall portion 28 to overlie exterior surface areas of the first and second annular side wall portions 27 and 28 and exterior surface areas of the inner annular wall portion 29 around the spoke attachment openings 30. The resin reinforcing member 24 effectively increases the thickness of the annular metallic rim member 22 about the entire circumference of the rim 18a to provide rigid reinforcement to the rim 18a.

When the resin reinforcing member 24 is applied to the annular metallic rim member 22, the thickness of the inner annular wall portion 29 at the spoke attachment openings 30 is effectively increased by a first amount to form a plurality of thick spoke attachment areas or sections A of the annular metallic rim member 22, and is effectively increased by a second smaller amount in intermediate areas to form thinner intermediate areas or sections B of the annular metallic rim member 22 disposed between adjacent pairs of the spoke attachment areas or sections A. Thus, the resin reinforcing member 24 varies in thickness about the inner portion of the annular metallic rim member 22 so as to form the thick spoke attachment areas or sections A and the thinner intermediate areas or sections B. In other words, the resin reinforcing member 24 are thicker at the spoke attachment areas A than at the intermediate areas B.

In particular, as seen in the illustrated embodiment of FIGS. 4-9, the resin reinforcing member 24 basically includes a plurality of first resin sheets 41, a plurality of second resin sheets 42, a plurality of third resin sheets 43, a plurality of fourth resin sheets 44, a plurality of fifth resin sheets 45 and a plurality of sixth resin sheets 46. The first, second, third and fourth resin sheets 41, 42, 43 and 44 constitute a plurality of discrete spoke attachment area reinforcing parts C that are individually spaced apart in the circumferential direction about the annular metallic rim member 22 such that a corresponding one of the discrete spoke attachment area reinforcing parts C overlies a corresponding one of the spoke attachment areas A of the annular metallic rim member 22. The fifth resin sheets 45 constitute a rim reinforcing part that overlies the intermediate areas B of the annular metallic rim member 22 and at least partially overlying the discrete spoke attachment area reinforcing parts C for effectively preventing the discrete spoke attachment area reinforcing parts C from being removed from the annular metallic rim member 22. The sixth resin sheets 46 constitute a patterned reinforcing part extending in the circumferential direction of the annular metallic rim member 22 and directly overlying the fifth resin sheets 45 (the rim reinforcing part). The sixth resin sheets 46 (the patterned reinforcing part) defining a plurality of non-patterned areas spaced apart in the circumferential direction of the annular metallic rim member 22. The non-patterned areas are locations where the sixth resin sheets 46 (the patterned reinforcing part) do not overlie the annular metallic rim member 22. The sixth resin sheets 46 (the patterned reinforcing part) at least partially overlies the discrete spoke attachment area reinforcing parts C for effectively preventing the discrete spoke attachment area reinforcing parts C from being removed from the annular metallic rim member 22.

It will be apparent to those skilled in the art from this disclosure that the discrete spoke attachment area reinforcing parts C can be made of fewer layers or more layers as needed and/or desired. Also either the fifth resin sheets 45 (the ring shaped rim reinforcing part) or the sixth resin sheets 46 (the patterned reinforcing part) could be eliminated as needed and/or desired. In other words, in alternative embodiments, only the fifth resin sheets 45 (the ring shaped rim reinforcing part) could be used in conjunction with the discrete spoke attachment area reinforcing parts C, or only the sixth resin sheets 46 (the patterned reinforcing part) could be used in conjunction with the discrete spoke attachment area reinforcing parts C. Moreover, it will be apparent to those skilled in the art from this disclosure that number of the discrete spoke attachment area reinforcing parts C depends upon the number of spokes. In addition, while only one spoke opening is shown in each of the discrete spoke attachment area reinforcing parts C in the illustrated embodiment, it will be apparent to those skilled in the art from this disclosure that two or more spoke openings can be formed in each of the discrete spoke attachment area reinforcing parts C for wheels with paired spokes or the like.

The discrete spoke attachment area reinforcing parts C are each basically formed of four layers that correspond to the first, second, third and fourth resin sheets 41, 42, 43 and 44, respectively In the illustrated embodiment, each of the discrete spoke attachment area reinforcing parts C has a total maximum (overall) thickness of two millimeters. Preferably, the overall thickness of each of the discrete spoke attachment area reinforcing parts C is in the range of 1.5 millimeters to 2.5 millimeters. In the illustrated embodiment, each of the four layers is formed of a reinforcing resin sheet material having epoxy with one or more carbon impregnated layers. In the illustrated embodiment, each of the reinforcing resin sheets in each layer has unidirectional carbon fibers impregnated in epoxy with the carbon fibers of arranged perpendicularly relative to the unidirectional fibers in the other of the reinforcing resin sheet. Thus, each of the discrete spoke attachment area reinforcing parts C is formed of a plurality of individual reinforcing layers that are bonded together and integrally disposed on the annular metallic rim member 22.

Figure 9:
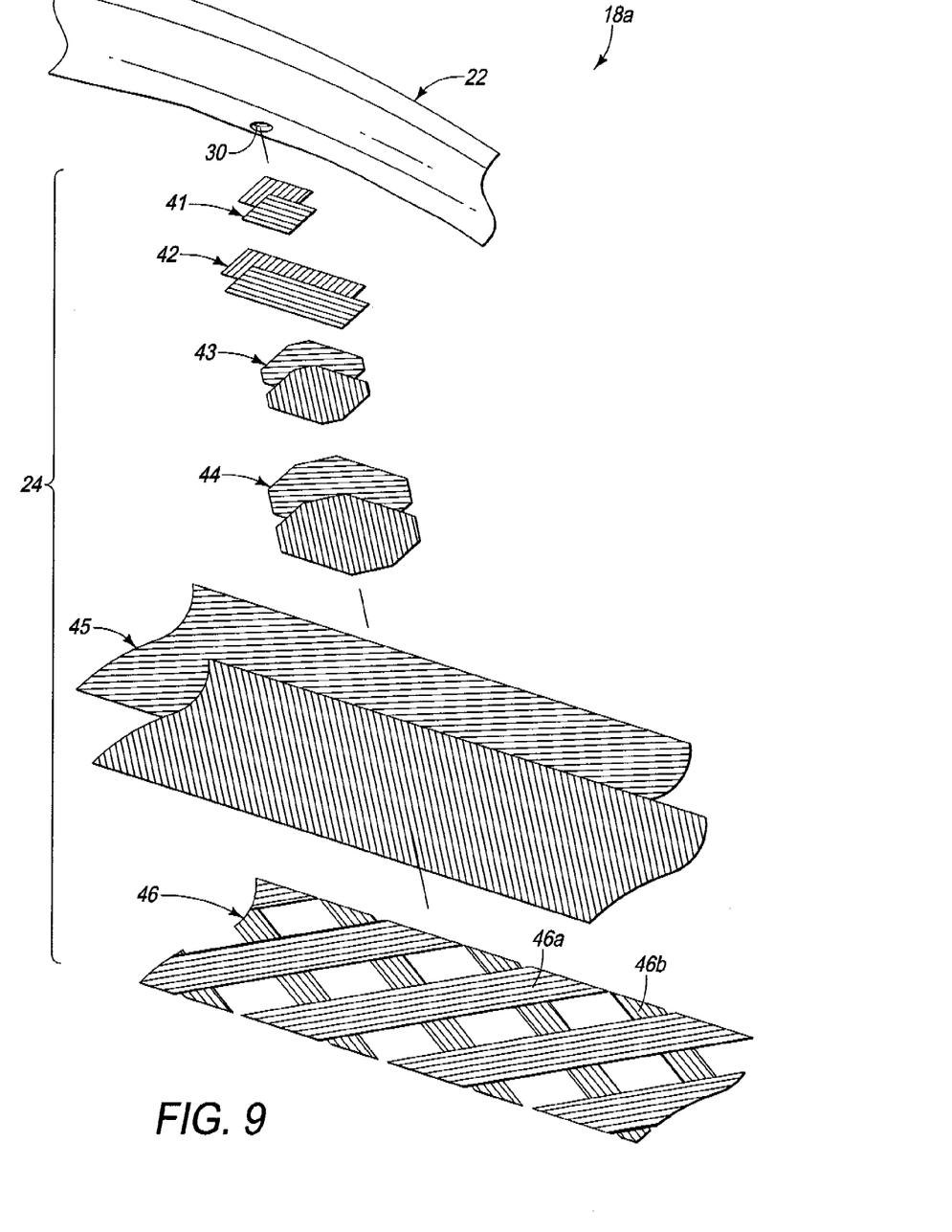
FIG. 9 is an exploded perspective view of the metallic rim member and the reinforcing member illustrated in FIGS. 4 to 6 and 8 in accordance with the first embodiment of the present invention.

The first resin sheets 41 are formed of a plurality of individually discrete sheets that are secured to the annular metallic rim member 22 at each of the spoke attachment openings 30 to overlie portions of the exterior surface areas of the inner annular wall portion 29 at each of the spoke attachment openings 30. Specifically, the first resin sheets 41 are preferably rectangular sheets having a predetermined first circumferential dimension and a predetermined first axial dimension. In the illustrated embodiment, the predetermined first circumferential dimension measures sixteen millimeters in the circumferential direction of the annular metallic rim member 22, while the predetermined first axial dimension measures twelve millimeters in the axial direction of the annular metallic rim member 22. The first resin sheets 41 are secured directly to the annular metallic rim member 22. Preferably, as seen in FIG. 9, the first resin sheets 41 forms a first reinforcing layer with two first reinforcing resin sheets having unidirectional fibers. The unidirectional fibers in one of the first reinforcing resin sheets extend axially, while the unidirectional fibers in the other of the first reinforcing resin sheets extend circumferentially. Alternatively, a single layer of a non-unidirectional carbon sheet having a mesh texture can be used instead of the two sheets.

The second resin sheets 42 are formed of a plurality of individually discrete sheets that are secured to the annular metallic rim member 22 at each of the spoke attachment openings 30 to overlie portions of the exterior surface areas of the inner annular wall portion 29 at each of the spoke attachment openings 30. Specifically, the second resin sheets 42 are preferably rectangular sheets having a predetermined second circumferential dimension and a predetermined second axial dimension. In the illustrated embodiment, the predetermined second circumferential dimension measures forty millimeters in the circumferential direction of the annular metallic rim member 22, while the predetermined second axial dimension measures twelve millimeters in the axial direction of the annular metallic rim member 22. The second resin sheets 42 are secured directly to the first resin sheets 41 and parts of the annular metallic rim member 22. In other words, the predetermined second circumferential dimension of the second reinforcing layer (the second resin sheets 42) is larger than the first circumferential dimension of the first reinforcing layer (the first resin sheets 41) and the predetermined second axial dimension of the second reinforcing layer (the second resin sheets 42) equal to or greater than the first axial dimension of the first reinforcing layer (the first resin sheets 41). Thus, the second resin sheets 42 are preferably larger than the first resin sheets 41 in the circumferential direction to directly contact the annular metallic rim member 22. Preferably the second resin sheets 42 are secured to the annular metallic rim member 22 after the first resin sheets 41 have been secured to the annular metallic rim member 22. Preferably, as seen in FIG. 9, the second resin sheets 42 forms a second reinforcing layer with two second reinforcing resin sheets having unidirectional fibers. The unidirectional fibers in one of the second reinforcing resin sheets extend axially, while the unidirectional fibers in the other of the second reinforcing resin sheets extend circumferentially. Alternatively, a single layer of a non-unidirectional carbon sheet having a mesh texture can be used instead of the two sheets.

The third resin sheets 43 are formed of a plurality of individually discrete sheets that are secured to the annular metallic rim member 22 at each of the spoke attachment openings 30 to overlie portions of the exterior surface areas of the annular side wall portion 27 and 28 and the exterior surface areas of the inner annular wall portion 29 at each of the spoke attachment openings 30. Specifically, the third resin sheets 43 are preferably octagonally shaped sheets having a predetermined third circumferential dimension and a predetermined third axial dimension. In the illustrated embodiment, the predetermined third circumferential dimension of the third resin sheets 43 measures measure twenty-six millimeters in the circumferential direction of the annular metallic rim member 22. The predetermined third axial dimension of the third resin sheets 43 measures twenty millimeters in the axial direction of the annular metallic rim member 22. The circumferential side edges of the third resin sheets 43 measures eighteen millimeters. The axial side edges of the third resin sheets 43 measures twelve millimeters. In other words, the predetermined third circumferential dimension of the third reinforcing layer (the third resin sheets 43) is larger than the circumferential dimension of the first reinforcing layer (the first resin sheets 41) and smaller than the circumferential dimension of the second reinforcing layer (the second resin sheets 42). The predetermined third axial dimension of the third reinforcing layer (the third resin sheets 43) is larger than the first and second axial dimensions of the first and second reinforcing layers (the first and second resin sheets 41 and 42). Thus, the third resin sheets 43 are secured to directly overlie the second resin sheets 42 and parts of the annular side wall portion 27 and 28. In other words, the third resin sheets 43 are preferably larger than the second resin sheets 42 in the axial direction to directly contact the annular metallic rim member 22. Preferably the third resin sheets 43 are secured to the annular metallic rim member 22 after the first and second resin sheets 41 and 42 have been secured together and secured to the annular metallic rim member 22. Preferably, as seen in FIG. 9, the third resin sheets 43 forms a third reinforcing layer with two third reinforcing resin sheets having unidirectional fibers. The unidirectional fibers in one of the third reinforcing resin sheets extend forty-five degrees to the circumferential direction of the annular metallic rim member 22, while the unidirectional fibers in the other of the third reinforcing resin sheets extend forty-five degrees to the circumferential direction of the annular metallic rim member 22 in a direction opposite the other sheet. Thus, the unidirectional fibers of the third reinforcing resin sheets 43 are non-radially and non-circumferentially arranged. Alternatively, a single layer of a non-unidirectional carbon sheet having a mesh texture can be used instead of the two sheets.

The fourth resin sheets 44 are similar to the third resin sheets 43, but are larger. The fourth resin sheets 44 are formed of a plurality of individually discrete sheets that are secured to the annular metallic rim member 22 at each of the spoke attachment openings 30 to overlie portions of the exterior surface areas of the annular side wall portion 27 and 28 and the exterior surface areas of the inner annular wall portion 29 at each of the spoke attachment openings 30. Specifically, the fourth resin sheets 44 are preferably octagonally shaped sheets having a predetermined fourth circumferential dimension and a predetermined fourth axial dimension. In the illustrated embodiment, the predetermined fourth circumferential dimension of the fourth resin sheets 44 measures measure forty millimeters in the circumferential direction of the annular metallic rim member 22. The predetermined fourth axial dimension of the fourth resin sheets 44 measures twenty-eight millimeters in the axial direction of the annular metallic rim member 22. The circumferential side edges of the fourth resin sheets 44 measures twenty-four millimeters. The axial side edges of the fourth resin sheets 44 measures twenty millimeters. In other words, the predetermined fourth circumferential dimension of the fourth reinforcing layer (the fourth resin sheets 44) is larger than the circumferential dimensions of the first and third reinforcing layers (the first and third resin sheets 41 and 43) and equal to the circumferential dimension of the second reinforcing layer (the second resin sheets 42). The predetermined fourth axial dimension of the fourth reinforcing layer (the fourth resin sheets 44) is larger than the axial dimensions of the first, second and third reinforcing layers (the first, second and third resin sheets 41, 42 and 43). Thus, the fourth resin sheets 44 are secured to directly overlie the third resin sheets 43 and parts of the annular side wall portion 27 and 28. In other words, the fourth resin sheets 44 are preferably larger than the third resin sheets 43 in the axial direction to directly contact the annular metallic rim member 22. Preferably the fourth resin sheets 44 are secured to the annular metallic rim member 22 after the first, second and third resin sheets 41, 42 and 43 have been secured together and secured to the annular metallic rim member 22. Preferably, as seen in FIG. 9, the fourth resin sheets 44 forms a fourth reinforcing layer with two fourth reinforcing resin sheets having unidirectional fibers. The unidirectional fibers in one of the fourth reinforcing resin sheets extend forty-five degrees to the circumferential direction of the annular metallic rim member 22, while the unidirectional fibers in the other of the fourth reinforcing resin sheets extends forty-five degrees to the circumferential direction of the annular metallic rim member 22 in a direction opposite to the other sheet. Thus, the unidirectional fibers of the fourth reinforcing resin sheets 44 are non-radially and non-circumferentially arranged. Alternatively, a single layer of a non-unidirectional carbon sheet having a mesh texture can be used instead of the two sheets.

In this first illustrated embodiment, the fifth resin sheets 45 forms a ring shaped rim reinforcing part that extends continuously in the circumferential direction about the entire circumferential area of the annular metallic rim member 22 and exteriorly overlying the spoke attachment areas A of the annular metallic rim member 22. Preferably, the fifth resin sheets 45 extend between the braking surfaces 26a such that the braking surfaces 26a are exposed (i.e., not covered by the fifth resin sheets 45). In other words, the fifth resin sheets 45 completely cover the exterior surface areas of the annular side wall portion 27 and 28 below the braking surfaces 26a and the exterior surface areas of the inner annular wall portion 29.

The fifth resin sheets 45 are formed of a plurality of individually discrete sheets that are secured to the exterior surface areas of the annular side wall portion 27 and 28 below the braking surfaces 26a and the exterior surface areas of the inner annular wall portion 29. Preferably the fifth resin sheets 45 are secured to the annular metallic rim member 22 after the first, second, third and fourth resin sheets 41, 42, 43 and 44 have been secured together and secured to the annular metallic rim member 22. In this first illustrated embodiment, the fifth resin sheets 45 (the ring shaped rim reinforcing part) has an overall maximum thickness in a range of 0.5 millimeter to about 1.5 millimeters.

Preferably, as seen in FIG. 9, the fifth resin sheets 45 fomms a fifth reinforcing layer with two fifth reinforcing resin sheets having unidirectional fibers. The unidirectional fibers in one of the fifth reinforcing resin sheets extend axially, while the unidirectional fibers in the other of the fifth reinforcing resin sheets extend circumferentially. Alternatively, a single layer of a non-unidirectional carbon sheet having a mesh texture can be used instead of the two sheets.

As mentioned above, the sixth reinforcing resin sheets 46 form a patterned reinforcing part that extends continuously in the circumferential direction about the annular metallic rim member 22 and that exteriorly overlies the fifth resin sheets 45 (the ring shaped or rim reinforcing part). The sixth reinforcing resin sheets 46 (the patterned reinforcing part) includes a plurality of first diagonal sections 46a and a plurality of second diagonal sections 46b. The first diagonal sections 46a extend in a first diagonal direction with respect to the circumferential direction of the annular metallic rim member 22. The second diagonal sections 46b extend in a second diagonal direction with respect to the circumferential direction of the annular metallic rim member 22. The first and second diagonal sections 46a and 46b overlap to form a repetitive X pattern, with a plurality of non-patterned areas in between the first and second diagonal sections 46a and 46b. Preferably, the first and second diagonal sections 46a and 46b overlap near a center plane passing through the spoke attachment openings 30 and also overlap at areas of the wall portions 27 and 28 that are located on opposite sides of the center plane of the annular metallic rim member 22. The first and second diagonal sections 46a and 46b are made from narrow unidirectional carbon bands that are six millimeters to eight millimeter width. The first and second diagonal sections 46a and 46b can be made of two stacked sheets having a total thickness of 0.1-0.5 millimeter. These two stacked sheets have perpendicularly arranged carbon fibers. Alternatively, a single layer of a non-unidirectional carbon sheet having a mesh texture can be used instead of the two carbon sheets for the first and second diagonal sections 46a and 46b.

As mentioned above, the first, second, third and fourth resin sheets 41, 42, 43 and 44 form the discrete spoke attachment area reinforcing parts C of the reinforcing member 24, while the fifth and sixth resin sheets 45 and 46 form the intermediate parts D of the reinforcing member 24. Accordingly, the resin reinforcing member 24 includes a reinforcing resin material that extends continuously in a circumferential direction about an entire circumferential area of the annular metallic rim member 22 with the thick sections spoke attachment sections (the discrete spoke attachment area reinforcing parts C) surrounding the areas about the spoke attachment openings 30 and thinner rim reinforcement sections (the intermediate parts D) between adjacent pairs of the thick sections spoke attachment sections (the discrete spoke attachment area reinforcing parts C).

Preferably, the resin sheets 41 to 46 are fiber reinforced resin/plastic sheets that include epoxy with one or more carbon fiber impregnated layers. The fiber impregnated resin the resin sheets 41 to 46 are melted together to form a plurality of integrated one-piece reinforcements. Thus, the rim 18a is a composite rim made of both metallic and non-metallic materials. The resin reinforcing member 24 is directly bonded to the annular metallic rim member 22. While heat is used to apply the resin sheets 41 to 46, the heat is lower than a temperature that would physical alter the metallic material of the annular metallic rim member 22.

The resin sheets 41 to 46 in this embodiment are preferably thin sheets of continuous reinforcement fibers impregnated with a thermoset resin or a thermoplastic resin, which are often called prepreg sheets. The resin sheets 41 to 46 (prepreg sheets) are soft material at room temperature. However, when resin sheets 41 to 46 (prepreg sheets) are heated, the resin once becomes low viscosity. However, after that the resin of the resin sheets 41 to 46 becomes very hard, e.g., solid at 130° C.-150° C.

In one preferred embodiment, the resin sheets 41 to 46 (prepreg sheets) include carbon fibers or a glass fiber impregnated with an epoxy resin. In other preferred embodiments, the resin sheets 41 to 46 (prepreg sheets) can include virtually any reinforcement fiber, with virtually any matrix resin that can carry out the present invention. The thickness and surface finish of the resin sheets 41 to 46 (prepreg sheets) can be varied to suit the desired requirements of the wheel.

The spokes 21a are tension spokes that interconnect the hub 20a and the rim 18a together. In the illustrated embodiment, the front bicycle wheel 12 includes sixteen of the spokes 21a that extend generally radially from the hub 20a to the rim 18a. Also, in the illustrated embodiment, the spokes 21a are coupled to the rim 18a at equally spaced circumferential locations as seen in FIG. 1. Of course, it will be apparent to those skilled in the art from this disclosure that the front bicycle wheel 12 could use a modified rim and/or hub in order to accommodate different spoking arrangements without departing from the scope of the present invention. Moreover, it will be apparent to those skilled in the art from this disclosure that the front bicycle wheel 12 could use a modified rim and/or hub in order to accommodate fewer or more spokes 21a if needed and/or desired. In any case, the spokes 21a are preferably coupled to the annular rim 18a in circumferentially spaced arrangement.

One possible method of manufacturing rim 18a will now be briefly explained. First, the annular metallic rim member 22 is formed utilizing conventional rim manufacturing techniques. For example, the annular metallic rim member 22 can be constructed by extruding a length of aluminum with the cross-sectional shape that includes the annular tire attachment portion 26, the side annular wall portions 27 and 28 and the inner annular wall portion 29. Next, the side annular wall portions 27 and 28 and the inner annular wall portion 29 are thinned so as to reduce the overall weight of the annular metallic rim member 22. Then, the aluminum extruded rim member is cut to the appropriate length and bent into a circular shape. The ends of the aluminum extruded rim member are then welded together. The various holes including spoke attachment openings 30 can be punched or drilled before or after the ends of the aluminum extruded rim member are welded together.

Figure 5:
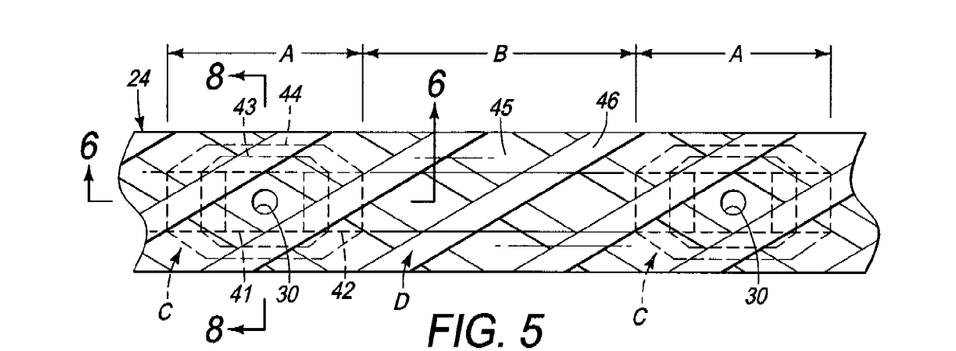
FIG. 5 is a bottom plan view of the front rim for the front wheel illustrated in FIGS. 1, 2 and 4 in accordance with the first embodiment of the present invention.
Figure 6:
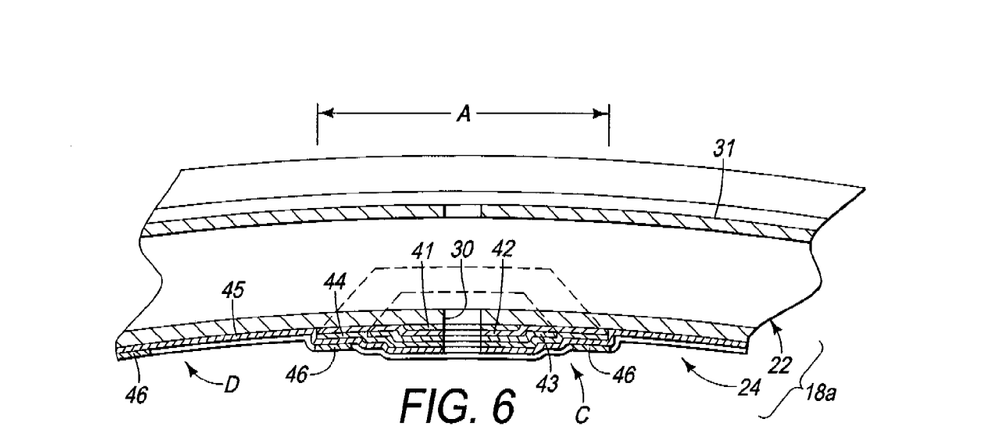
FIG. 6 is an enlarged, simplified cross sectional view of the front rim for the front wheel illustrated in FIGS. 1, 2, 4 and 5, as seen along section line 6-6 of FIG. 5.
Figure 7:
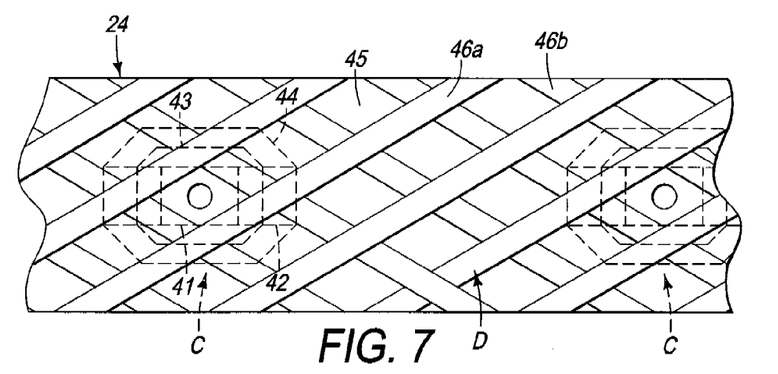
FIG. 7 is a partial, diagrammatic bottom plan of the reinforcing member, but prior to application of the reinforcing member to the metallic rim member.

Once the annular metallic rim member 22 is formed with the cross-sectional shape illustrated in FIGS. 3 and 5, the resin reinforcing member 24 is applied to the annular metallic rim member 22. This can be done in a single stage or in several stages with one or more layers being at once. Preferably, the fifth and sixth sheets 45 and 46 are applied to the annular metallic rim member 22 such that they initially overlap the braking surfaces 26a. Then the fifth and sixth sheets 45 and 46 are preferably trimmed using a conventional cutting/grinding tool to remove the excess material that overlaps the braking surfaces 26a. The application of the resin sheets 41 to 46 can be accomplished by applying a heat shrink wrap material (not shown) over the resin sheets 41 to 46. Preferably, the heat shrink wrap material is a tape that is spirally wound around the entire circumference of the annular metallic rim member 22 with a slight overlap between adjacent coils. Then heat is applied to the heat shrink wrap material such that the heat shrink wrap material firmly presses the resin sheets 41 to 46 against the annular metallic rim member 22. This application of the heat to the heat shrink wrap material also causes the resin of the resin sheets 41 to 46 to melt and thus adhere to the annular metallic rim member 22.

Preferably, the heat is applied such that the annular metallic rim member 22 with the resin reinforcing member 24 is heated to between about 130° C. to about 150° C., preferably about 130° C., for about 3 hours. The heating temperature is selected based on the material(s) of the resin reinforcing member 24 and the annular metallic rim member 22. Specifically, the heating temperature is selected such that the resin reinforcing member 24 will melt/adhere to the annular metallic rim member 22, but also such that the physical properties of the annular metallic rim member 22 will not be altered by the heat (temperature) needed to melt/adhere the resin reinforcing member 24 thereto. Of course, it will be apparent to those skilled in the art from this disclosure that the heating temperature and/or heating time may vary depending the exact materials used for the resin reinforcing member 24 and the annular metallic rim member 22.

Once the resin reinforcing member 24 has been bonded to the annular metallic rim member 22, the spoke attachment openings 30 are enlarged from an initial size of about 2.9 millimeter to about 5.0 millimeters. Enlargement of the spoke attachment openings 30 is preformed by drilling/punching through the resin reinforcing member 24 and the inner annular wall portion 29 at a pre-existing spoke attachment openings. Once the enlarged spoke attachment openings 30 have been formed, the rim 18a is ready to be attached to the hub 20a by the spokes 21a and the spoke nipples in a conventional manner.

Figure 11:
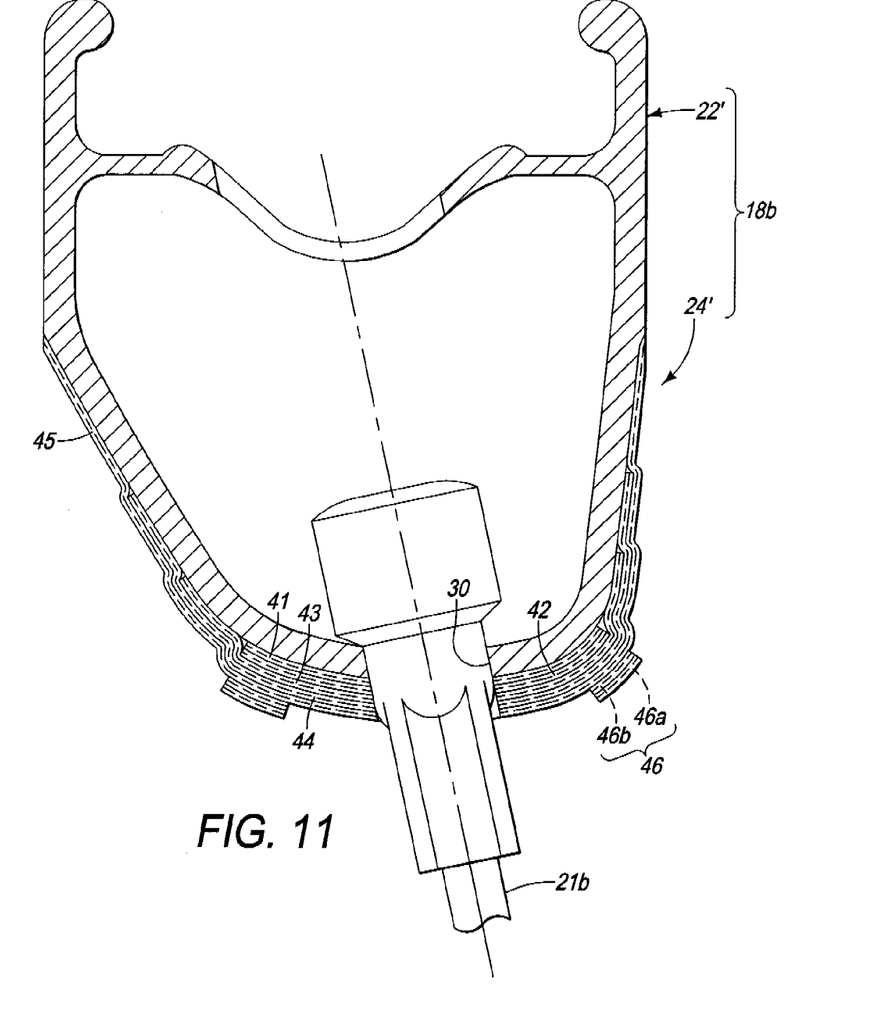
FIG. 11 is an enlarged cross sectional view of the rear rim for the rear wheel as seen along section line 11-11 of FIG. 3, showing one of the spokes attached to the rear rim.
Figure 12:
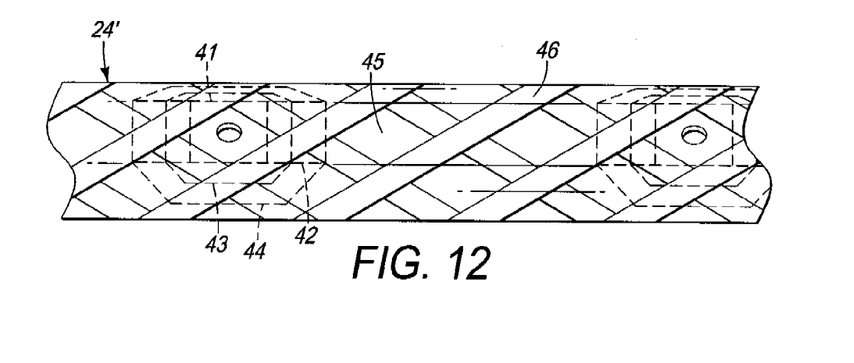
FIG. 12 is a bottom plan view of the rear rim for the rear wheel illustrated in FIGS. 1, 3 and 11 in accordance with the first embodiment of the present invention.
Figure 13:
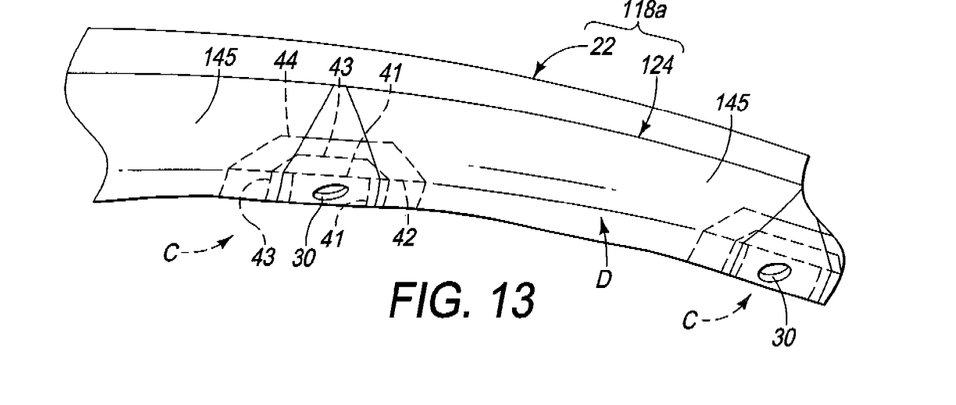
FIG. 13 is a partial perspective view of a front rim for a front wheel in accordance with a second embodiment of the present invention.
Figure 14:
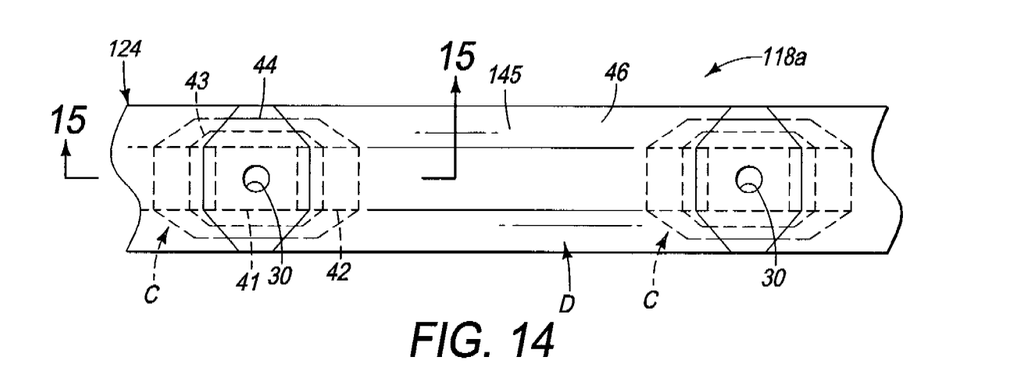
FIG. 14 is a bottom plan view of the front rim for the front wheel illustrated in FIG. 13 in accordance with the second embodiment of the present invention.
Figure 15:
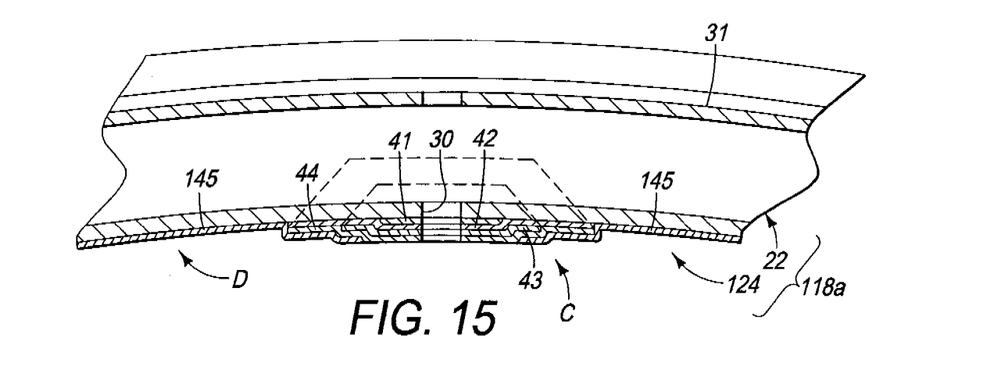
FIG. 15 is an enlarged, simplified cross sectional view of the front rim for the front wheel illustrated in FIGS. 13 and 14, as seen along section line 15-15 of FIG. 14.
Figure 16:
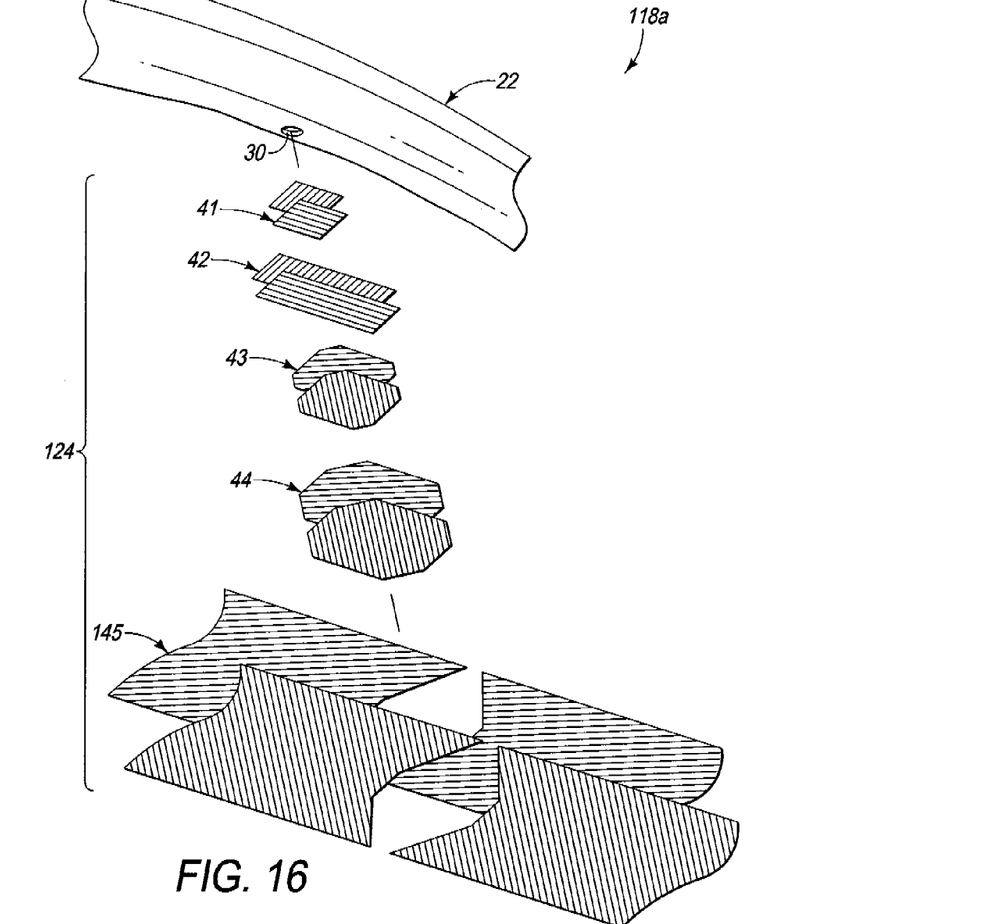
FIG. 16 is an exploded perspective view of the metallic rim member and the reinforcing member illustrated in FIGS. 13 to 15 in accordance with the second embodiment of the present invention.

Referring to FIGS. 11 and 12, the rear rim 18b is illustrated, and basically includes an annular metallic rim member 22' with a resin reinforcing member 24' applied to the annular metallic rim member 22'. The resin reinforcing member 24' is identical to the resin reinforcing member 24, except for a minor variation in size to accommodate the shape of the annular metallic rim member 22', Thus, the reference numbers of the resin reinforcing member 24 will be used for the same parts of the resin reinforcing member 24'.

Referring to FIGS. 13 to 17, a front rim 118a is illustrated in accordance with a second embodiment of the present invention. The front rim 118a basically includes the annular metallic rim member 22 from the first embodiment with a resin reinforcing member 124 applied to the annular metallic rim member 22. The resin reinforcing member 124 is identical to the resin reinforcing member 24, except for the fifth layer has been changed to be formed of a plurality of discrete rim reinforcing sections 145 individually arranged in the circumferential direction of the annular metallic rim member 22. Thus, the discrete rim reinforcing sections 145 form a ring shaped rim reinforcing part that is discontinuous at each of the spoke openings 30 and at least partially overlying the discrete spoke attachment area reinforcing parts C. As mentioned above, the fifth layer (the fifth resin sheets 45) of the resin reinforcing member 24 forms a continuous ring shaped rim reinforcing part that extends continuously in the circumferential direction about the entire circumferential area of the annular metallic rim member 22 and exteriorly overlying the spoke attachment areas A of the annular metallic rim member 22. In other words, the only difference between the resin reinforcing members 24 and 124 is that the fifth layer (the fifth resin sheets 45) of the resin reinforcing member 24 is continuous and the fifth layer (the fifth resin sheets 145) of the resin reinforcing member 124 is discontinuous at each of the spoke openings 30. The construction of the fifth layer (the fifth resin sheets 45) of the resin reinforcing member 24 is otherwise identical to the construction of the fifth layer (the fifth resin sheets 145) of the resin reinforcing member 124. Thus, the reference numbers of the resin reinforcing member 24 will be used for the same parts of the resin reinforcing member 124. Moreover, the descriptions of the same parts of the resin reinforcing member 124 will be omitted for the sake of brevity.

Figure 17:
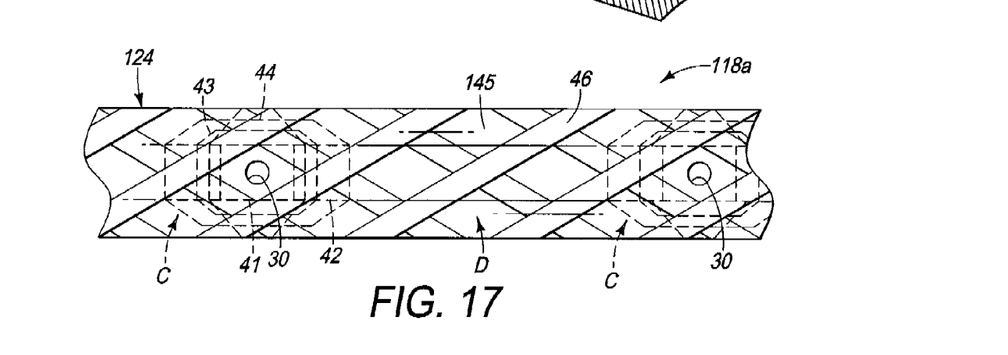
FIG. 17 is a bottom plan view of the front rim for the front wheel illustrated in FIGS. 13 to 15 in which the patterned reinforcing part has been added.

The sixth reinforcing resin sheets 46 (the patterned reinforcing part) can be either eliminated as shown in FIGS. 13 to 16 in this second embodiment or included as seen in FIG. 17. Thus, the fifth and sixth resin sheets 145 and 46 form the intermediate parts D of the reinforcing member 124 in this embodiment when both the fifth and sixth resin sheets 145 and 46 are used. Alternatively, the intermediate parts D of the reinforcing member 124 are formed by only one of the fifth and sixth resin sheets 145 and 46.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
   an annular metallic rim member including a pair of oppositely facing annular braking surfaces and a plurality of spoke attachment areas with at least one spoke attachment opening formed in each of the spoke attachment areas and a plurality of intermediate areas disposed between adjacent pairs of the spoke attachment areas; and
   a reinforcing member extending in a circumferential direction about the annular metallic rim member and exteriorly overlying the annular metallic rim member without overlying the pair of oppositely facing annular braking surfaces, the reinforcing member including
      a plurality of discrete spoke attachment area reinforcing parts individually spaced apart in the circumferential direction such that a corresponding one of the discrete spoke attachment area reinforcing parts overlies a corresponding one of the spoke attachment areas of the annular metallic rim member, and
      a rim reinforcing part overlying the intermediate areas of the annular metallic rim member and at least partially overlying the discrete spoke attachment area reinforcing parts.

2. The bicycle rim according to claim 1, wherein
the reinforcing member further includes a patterned reinforcing part extending in the circumferential direction and overlying the rim reinforcing part, with the patterned reinforcing part defining a plurality of non-patterned areas spaced apart in the circumferential direction.

3. The bicycle rim according to claim 2, wherein
the patterned reinforcing part includes a plurality of first diagonal sections extending in a first diagonal direction with respect to the circumferential direction and a plurality of second diagonal sections extending in a second diagonal direction with respect to the circumferential direction.

4. The bicycle rim according to claim 3, wherein
the first and second diagonal sections overlap to form a repetitive X pattern.

5. The bicycle rim according to claim 4, wherein
the first and second diagonal sections overlap near a plane passing through the spoke attachment openings.

6. The bicycle rim according to claim 5, wherein
the first and second diagonal sections further overlap at areas located on opposite sides of the plane passing through the spoke attachment openings.

7. The bicycle rim according to claim 1, wherein
each of the discrete spoke attachment area reinforcing parts is formed of a plurality of different sized individual reinforcing layers that are bonded together and integrally disposed on the annular metallic rim member separately and circumferentially spaced from the remaining discrete spoke attachment area reinforcing parts.

8. The bicycle rim according to claim 7, wherein
each of the reinforcing layers is formed of a reinforcing resin sheet material including epoxy with one or more carbon impregnated layers.

9. The bicycle rim according to claim 7, wherein
each of the discrete spoke attachment area reinforcing parts includes a first layer and a second layer overlying the first layer that is larger than the first layer.

10. The bicycle rim according to claim 9, wherein
each of the discrete spoke attachment area reinforcing parts includes a third layer overlying the second layer that is larger than the second layer.

11. The bicycle rim according to claim 1, wherein
each of the discrete spoke attachment area reinforcing parts has an overall maximum thickness in a range of 1.5 millimeters to about 2.5 millimeters.

12. The bicycle rim according to claim 1, wherein
the rim reinforcing part has an overall maximum thickness in a range of 0.5 millimeter to about 1.5 millimeters.

13. The bicycle rim according to claim 1, wherein
the annular metallic rim member includes an annular tire attachment portion adapted to have a tire mounted thereon, a first annular side wall portion, a second annular side wall portion and an inner annular wall portion connecting the first and second annular side wall portions with the spoke attachment openings being formed in the inner annular wall portion.

14. The bicycle rim according to claim 13, wherein
the annular tire attachment portion includes an annular connecting section connecting the first and second annular side wall portions such that an annular hollow area is bounded by the first and second annular side wall portions, the inner annular wall portion and the annular connecting section.

15. A bicycle rim comprising:

an annular metallic rim member including a pair of oppositely facing annular braking surfaces and a plurality of spoke attachment areas with at least one spoke attachment opening formed in each of the spoke attachment areas; and a reinforcing member extending in a circumferential direction about the annular metallic rim member and exteriorly overlying the annular metallic rim member without overlying the pair of oppositely facing annular braking surfaces, the reinforcing member including a plurality of discrete spoke attachment area reinforcing parts individually spaced apart in the circumferential direction such that a corresponding one of the discrete spoke attachment area reinforcing parts overlies a corresponding one of the spoke attachment areas of the annular metallic rim member, and a patterned reinforcing part extending in the circumferential direction and overlying the discrete spoke attachment area reinforcing parts, with the patterned reinforcing part defining a plurality of non-patterned areas spaced apart in the circumferential direction.

16. The bicycle rim according to claim 15, wherein the patterned reinforcing part includes a plurality of first diagonal sections extending in a first diagonal direction with respect to the circumferential direction and a plurality of second diagonal sections extending in a second diagonal direction with respect to the circumferential direction.

17. The bicycle rim according to claim 16, wherein the first and second diagonal sections overlap to form a repetitive X pattern.

18. The bicycle rim according to claim 15, wherein each of the discrete spoke attachment area reinforcing parts is formed of a plurality of different sized individual reinforcing layers that are bonded together and integrally disposed on the annular metallic rim member separately and circumferentially spaced from the remaining discrete spoke attachment area reinforcing parts.

19. The bicycle rim according to claim 18, wherein each of the discrete spoke attachment area reinforcing parts includes a first layer and a second layer overlying the first layer that is larger than the first layer.

20. The bicycle rim according to claim 19, wherein each of the discrete spoke attachment area reinforcing parts includes a third layer overlying the second layer that is larger than the second layer.

21. A bicycle rim comprising:

an annular metallic rim member including a plurality of spoke attachment areas with at least one spoke attachment opening formed in each of the spoke attachment areas and a plurality of intermediate areas disposed between adjacent pairs of the spoke attachment areas; and a reinforcing member extending in a circumferential direction about the annular metallic rim member and exteriorly overlying the annular metallic rim member, the reinforcing member including a plurality of discrete spoke attachment area reinforcing parts individually spaced apart in the circumferential direction such that a corresponding one of the discrete spoke attachment area reinforcing parts overlies a corresponding one of the spoke attachment areas of the annular metallic rim member, and a rim reinforcing part overlying the intermediate areas of the annular metallic rim member and at least partially overlying the discrete spoke attachment area reinforcing parts, the rim reinforcing part including a plurality of discrete rim reinforcing sections individually arranged in the circumferential direction with each of the discrete rim reinforcing sections being separate and spaced from the remaining discrete rim reinforcing sections to form a plurality of circumferential spaces between the discrete rim reinforcing sections.

22. A bicycle rim comprising:

an annular metallic rim member including a pair of oppositely facing annular braking surfaces and a plurality of spoke attachment areas with at least one spoke attachment opening formed in each of the spoke attachment areas and a plurality of intermediate areas disposed between adjacent pairs of the spoke attachment areas; and a reinforcing member extending in a circumferential direction about the annular metallic rim member and exteriorly overlying the annular metallic rim member without overlying the pair of oppositely facing annular braking surfaces, the reinforcing member including a rim reinforcing part overlying the intermediate areas of the annular metallic rim member and overlying the spoke attachment areas of the annular metallic rim member, and a patterned reinforcing part extending in the circumferential direction and overlying the rim reinforcing part, with the patterned reinforcing part defining a plurality of non-patterned areas spaced apart in the circumferential direction.

23. A bicycle rim comprising:

an annular metallic rim member including a plurality of spoke attachment areas with at least one spoke attachment opening formed in each of the spoke attachment areas and a plurality of intermediate areas disposed between adjacent pairs of the spoke attachment areas; and a reinforcing member extending in a circumferential direction about the annular metallic rim member and exteriorly overlying the annular metallic rim member, the reinforcing member including a rim reinforcing part overlying the intermediate areas of the annular metallic rim member and overlying the spoke attachment areas of the annular metallic rim member, and a patterned reinforcing part extending in the circumferential direction and overlying the rim reinforcing part, with the patterned reinforcing part defining a plurality of non-patterned areas spaced apart in the circumferential direction, the rim reinforcing part including a plurality of discrete rim reinforcing sections individually arranged in the circumferential direction with each of the discrete rim reinforcing sections being separate and spaced from the remaining discrete rim reinforcing sections to form a plurality of circumferential spaces between the discrete rim reinforcing sections.

24. A bicycle rim comprising:

an annular metallic rim member including an inner annular wall portion, a pair of annular side walls extending radially outwardly from the inner annular wall portion, the annular metallic rim member having a plurality of spoke attachment areas with at least one spoke attachment opening formed in each of the spoke attachment areas and a plurality of intermediate areas disposed between adjacent pairs of the spoke attachment areas; and a reinforcing member extending in a circumferential direction about the annular metallic rim member and exteriorly overlying the annular metallic rim member, the reinforcing member including a plurality of discrete spoke attachment area reinforcing parts individually spaced apart in the circumferential direction such that a corresponding one of the discrete spoke attachment area reinforcing parts overlies a corresponding one of the spoke attachment areas of the annular metallic rim member, and a rim reinforcing part overlying the intermediate areas of the annular metallic rim member and at least partially overlying the discrete spoke attachment area reinforcing parts, the rim reinforcing part extending radially outwardly further up the annular sidewalls than the circumferentially spaced apart discrete spoke attachment area reinforcing parts.

25. A bicycle rim comprising:

an annular metallic rim member including an inner annular wall portion and a pair of annular side walls extending radially outwardly from the inner annular wall portion, the annular metallic rim member having a plurality of spoke attachment areas with at least one spoke attachment opening formed in each of the spoke attachment areas; and a reinforcing member extending in a circumferential direction about the annular metallic rim member and exteriorly overlying the annular metallic rim member, the reinforcing member including a plurality of discrete spoke attachment area reinforcing parts individually spaced apart in the circumferential direction such that a corresponding one of the discrete spoke attachment area reinforcing parts overlies a corresponding one of the spoke attachment areas of the annular metallic rim member, and a patterned reinforcing part extending in the circumferential direction and overlying the discrete spoke attachment area reinforcing parts, with the patterned reinforcing part defining a plurality of non-patterned areas spaced apart in the circumferential direction, the patterned reinforcing part extending radially outwardly further up the annular sidewalls than the circumferentially spaced apart discrete spoke attachment area reinforcing parts.

* * * * *